United States Patent
Peng et al.

(10) Patent No.: US 8,856,581 B2
(45) Date of Patent: Oct. 7, 2014

(54) METHOD FOR RESOURCE INFORMATION BACKUP OPERATION BASED ON PEER TO PEER NETWORK AND PEER TO PEER NETWORK THEREOF

(75) Inventors: Yonglin Peng, Shenzhen (CN); Quanjun Tao, Shenzhen (CN); Yonghui Zhang, Shenzhen (CN); Xiaofeng Qiu, Shenzhen (CN); Zhenyu Lei, Shenzhen (CN); Chunhong Zhang, Shenzhen (CN); Lichun Li, Shenzhen (CN); Yan Wang, Shenzhen (CN); Wei Mi, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 393 days.

(21) Appl. No.: 13/138,734

(22) PCT Filed: Apr. 7, 2010

(86) PCT No.: PCT/CN2010/071618
§ 371 (c)(1),
(2), (4) Date: Sep. 21, 2011

(87) PCT Pub. No.: WO2010/115374
PCT Pub. Date: Oct. 14, 2010

(65) Prior Publication Data
US 2012/0042197 A1 Feb. 16, 2012

(30) Foreign Application Priority Data
Apr. 8, 2009 (CN) .......................... 2009 1 0133732

(51) Int. Cl.
| | |
|---|---|
| G06F 11/00 | (2006.01) |
| G06F 17/30 | (2006.01) |
| H04L 29/08 | (2006.01) |
| H04L 12/24 | (2006.01) |
| H04L 29/14 | (2006.01) |
| G06F 11/20 | (2006.01) |

(52) U.S. Cl.
CPC ............... *H04L 67/104* (2013.01); *H04L 69/40* (2013.01); *G06F 11/2048* (2013.01); *G06F 17/30206* (2013.01); *G06F 11/2035* (2013.01); *H04L 41/0668* (2013.01); *H04L 67/1059* (2013.01)
USPC ........................................................ 714/4.11

(58) Field of Classification Search
None
See application file for complete search history.

(56) References Cited

U.S. PATENT DOCUMENTS
2009/0019515 A1   1/2009   Excoffier

FOREIGN PATENT DOCUMENTS
| | | |
|---|---|---|
| CN | 101127653 A | 2/2008 |
| CN | 101251797 A | 8/2008 |
| CN | 101360042 A | 2/2009 |

*Primary Examiner* — Christopher McCarthy
(74) *Attorney, Agent, or Firm* — Farjami & Farjami LLP (57) ABSTRACT

The present invention provides a method for resource information backup operation based on peer to peer network, comprising: an initiating node sending an out-of-domain backup node determining request to a connecting node in backup domain, and said out-of-domain backup node determining request including the resource global identifier of said resource information to be backed up, and the connecting node in said backup domain and said host node in which the resource information is saved have different domain identifiers; the connecting node in said backup domain determining an out-of-domain backup node according to information of said resource global identifier and out-of-domain backup rules, and sending routing information of said out-of-domain backup node to said initiating node; and said initiating node sending an out-of-domain backup operation request to said out-of-domain backup node according to said routing information, and said out-of-domain backup node implementing corresponding processing according to said out-of-domain backup operation request.

15 Claims, 5 Drawing Sheets

FIG. 1

Node global identifier

| Domain ID | Node identifier (Node ID) |

Resource global identifier

| Domain ID | Resource identifier (Resource ID) |

METHOD FOR RESOURCE INFORMATION BACKUP OPERATION BASED ON PEER TO PEER NETWORK AND PEER TO PEER NETWORK THEREOF

This is a U.S. national phase application which is based on, and claims priority from, PCT application Serial No. PCT/CN2010/071618, filed Apr. 7, 2010, which claims priority from foreign application Serial No. 200910133732.7, filed Apr. 8, 2009, in China.

TECHNICAL FIELD

The present invention relates to peer to peer network, and more especially, to a method for resource information backup operation based on peer to peer network and peer to peer network thereof.

BACKGROUND OF THE RELATED ART

As the overlay network of the existing Internet, Peer to Peer (P2P) network shares the computer resources and services with the peer to peer exchanging between the systems to achieve distributed, reliable, extendable and robust network application mode. It breaks through the conventional client/server (C/S) mode, and all nodes are equivalent in the network. Each node works as the server to provide services to other nodes and also enjoys the services provided by other nodes.

With the rapid development of Internet and broadband access network, P2P technology has a lot of applications and research, especially, the whole distributed and structured P2P network (that is, the DHT network) based on the distributed hash table (DHT) and the overlay network is widely paid attention in the industry.

In the DHT network, some nodes might exit the network normally or abnormally, which easily leads to the lose of the storage resource, in order to enhance the availability of the storage resource, that is, to avoid a situation in which the resource cannot be acquired due to the failure of an individual node, some other nodes are generally used to back up the resource in the DHT network, and the node which is used to back up a certain resource is called the backup node of the resource. Backing up resource improves the availability of the resource.

In the prior art, the resource is mainly backed up internally in one DHT network. For example, in the Chord, the nodes are arranged into a DHT ring clockwise from small to large according to the node ID, a certain node takes the first node encountered in the clockwise direction as its backward node, and since each node maintains its backward node list, the data stored in the node are directly backed up in its backward node, and if the data should be backed up for several copies, the data should be saved in multiple backward nodes. The maintenance of this backup method is relatively simple, but in some abnormal situations, however, this method cannot guarantee the availability of the resource. There are a lot of methods in the prior art to improve the backup method internal in the DHT network, and the improvements are mainly focused on two sides: one is backing up the data for several copies and storing the copies in a plurality of nodes according to certain rules, and only taking out one copy in recovery; the other is dividing the data into several redundant segments, therefore, only some segments are needed to recover the data, so as to achieve backing up the data, the storage amount of this backup method is relatively small, but the maintenance overhead is relatively big.

Since the abovementioned backup method only works within the DHT network, when there are few nodes exiting the network, this method can recover the network data very well, but when there are lots of nodes exiting abnormally, some data might cannot be recovered, which is not permitted by networks with very high reliability requirements.

CONTENT OF THE INVENTION

The present invention provides a method for resource information backup operation based on P2P network and P2P network thereof to better ensure the reliability and availability of the data.

In order to solve the problem in the prior art, the present invention provides a method for resource information backup operation based on peer to peer network, wherein a node in the peer to peer network has a node global identifier including a domain identifier and a node identifier, and said resource information in the peer to peer network has a resource global identifier including a domain identifier and a resource identifier, and said resource information is saved in a host node having the same domain identifier as said resource information, and said method comprises:

an initiating node sending an out-of-domain backup node determining request to a connecting node in backup domain, and said out-of-domain backup node determining request including the resource global identifier of said resource information, and the connecting node in said backup domain and said host node in which the resource information is saved have different domain identifiers;

the connecting node in said backup domain determining an out-of-domain backup node according to information of said resource global identifier and out-of-domain backup rules, and sending routing information of said out-of-domain backup node to said initiating node; and said initiating node sending an out-of-domain backup operation request to said out-of-domain backup node according to said routing information, said out-of-domain backup operation request including the information of the resource global identifier of said resource information, and said out-of-domain backup node implementing a corresponding processing according to said out-of-domain backup operation request.

The method may also have the following features: if said out-of-domain backup operation request is an out-of-domain backup request, said initiating node is the host node in which the resource information is saved, and the out-of-domain backup request sent by said host node to said out-of-domain backup node also includes resource information content of said resource information, the out-of-domain backup node backs up the resource information content and the resource global identifier of said resource information according to said out-of-domain backup request;

if said out-of-domain backup operation request is an out-of-domain backup inquiry request, said initiating node is an inquiry node, said out-of-domain backup node returns the resource information content to be inquired to said inquiry node according to the information of the resource global identifier in the out-of-domain backup inquiry request;

if said out-of-domain backup operation request is an out-of-domain backup recovery request, said initiating node is a node detecting failure of the host node in which the resource information is saved, and said information of the resource global identifier is the resource global identifier or the resource global identifier range of the resource information to be recovered, and said resource global identifier or the resource global identifier range is determined by said initiating node according to in-domain resource storage rules, said out-of-domain backup node returns the resource information content corresponding to said resource global identifier or a resource global identifier in the resource global identifier range to said initiating node, and then the initiating node saving the resource information content.

The method may also have the following features:

the node in said peer to peer network saves a resource information table, an in-domain routing table and an out-of-domain routing table, wherein, said resource information table comprises the resource global identifier and resource information content of the resource information, and said in-domain routing table comprises node global identifier and the routing information of an in-domain node which has connection relationship with the nodes in the in-domain routing table, and said out-of-domain routing table comprises the node global identifier and the routing information of out-of-domain nodes which has connection relationship with the nodes saving the out-of-domain routing table, the out-of-domain backup node is determined in combination with the node global identifier in the in-domain routing table.

To solve the problem existing in the prior art, the present invention also provides a node used in peer to peer network, said node having a node global identifier including a domain identifier and a node identifier, and resource information of the peer to peer network having a resource global identifier including a domain identifier and a resource identifier, and said node working as an initiating node, a host node, a connecting node and an out-of-domain backup node in the peer to peer network;

said node comprising a receiving module, an out-of-domain backup node determining module connecting with said receiving module, and a processing module connecting with said receiving module and said out-of-domain backup node determining module, wherein:

the receiving module is configured to receive an out-of-domain backup node determining request sent by said initiating node, wherein, said out-of-domain backup node determining request includes resource global identifier information of the resource information which should be backed up, and the node at which said receiving module is located and the host node in which said resource information to be backed up is saved have different domain identifiers; said receiving module is also configured to receive an out-of-domain backup operation request sent by said initiating node;

said out-of-domain backup node determining module is configured to determine the out-of-domain backup node according to the resource global identifier information and the out-of-domain backup rules;

said processing module is configured to send routing information of the out-of-domain backup node to the initiating node; and to implement a corresponding processing according to said out-of-domain backup operation request.

The node may also have the following features; said processing module is configured to:

if said out-of-domain backup operation request is an out-of-domain backup request, and when said initiating node is the host node in which the resource information is saved and said out-of-domain backup operation request includes resource information content of said resource information, back up the resource information content and the resource global identifier of the resource information included in said out-of-domain backup operation request;

if said out-of-domain backup operation request is an out-of-domain backup inquiry request, when said initiating node is an inquiry node, return the resource information content of the resource information to be inquired to the inquiry node according to the resource global identifier information in said out-of-domain backup inquiry request;

if said out-of-domain backup operation request is an out-of-domain backup recovery request, when said initiating node is the node that detects failure of the host node in which said resource information is saved, and the resource global identifier information in said out-of-domain backup recovery request is the resource global identifier or the resource global identifier range of the resource information that needs to be recovered, and the resource global identifier or the resource global identifier range of the resource information is determined by the initiating node according to in-domain resource storage rules, return the resource information content corresponding to the resource global identifier or a resource global identifier in the resource global identifier range to the initiating node according to said out-of-domain backup recovery request.

Said node also comprises a storing module connecting with said out-of-domain backup node determining node and the processing module, the storing module is configured to store resource information table, in-domain routing table and out-of-domain routing table, wherein, said resource information table comprises the resource global identifier and resource information content of the resource information, said in-domain routing table comprises a node global identifier and routing information of an in-domain node having connection relationship with a node saving the in-domain routing table, and said out-of-domain routing table comprises the node global identifier and routing information of an out-of-domain node having connection relationship with a node saving the out-of-domain routing table, and said out-of-domain backup node determining module is configured to determine the out-of-domain backup node according to the resource global identifier information in the out-of-domain backup node determining request, out-of-domain backup domain rules and the node global identifier in the in-domain routing table.

To solve the problem existing in the prior art, the present invention also provides a peer to peer network, and the peer to peer network comprises a node as mentioned in the above.

To solve the problem in the prior art, the present invention also provides a method for resource information backup operation based on peer to peer network, wherein a node in the peer to peer network has a node global identifier including a domain identifier and a node identifier, and said resource information has a resource global identifier including a domain identifier and a resource identifier, and said resource information is saved in a host node which has the same domain identifier as said resource information, and said method comprises:

an initiating node sending an out-of-domain backup operation request to an connecting node in a backup domain, said out-of-domain backup node operation request including the resource global identifier of the resource information, and a connecting node in the backup domain and said host node have different domain identifiers;

the connecting node in said backup domain determining an out-of-domain backup node according to said resource global identifier and out-of-domain backup rules, and forwarding said out-of-domain backup operation request to said out-of-domain backup node, and the out-of-domain backup operation request including the routing information of the initiating node and resource global identifier information of the resource information;

said out-of-domain backup node implementing a corresponding processing according to said out-of-domain backup operation request.

Said out-of-domain backup operation request is an out-of-domain backup request, an out-of-domain backup inquiry request or an outer-of-domain recovery request; if said out-of-domain backup operation request is the out-of-domain backup request, said out-of-domain backup request also includes resource information content to be backed up.

To solve the problem existing in the prior art, the present invention also provides a node used in peer to peer network, and said node having a node global identifier including a domain identifier and a node identifier, and resource information of the peer to peer network having a resource global identifier including a domain identifier and a resource identifier, and said node being configured to:

save the global identifiers of the other nodes in the same domain, save the resource information having the same domain identifier therewith, back up the resource information saved in out-of-domain nodes having different domain identifiers, and determine an out-of-domain backup node to back up the resource information saved in said node according to the resource global identifier of the resource information, the global identifiers of nodes in a backup domain, as well as out-of-domain backup rules.

Said node is also configured to back up the resource information saved in other nodes having the same domain identifier as said node.

To solve the problem existing in the prior art, the present invention also provides a peer to peer network, and said peer to peer network comprises the node as mentioned in the above.

Compared with the prior art, the method of the present invention and the P2P network thereof make the out-of-domain backups of the resource information to guarantee the reliability and availability of the data; moreover, out-of-domain backup of the resource information is made, thus when there is node in or out the local domain network, there is no need to adjust the out-of-domain backup data, only when there is change in the resource the out-of-domain backup data should be adjusted, thus effectively reduce the extra overhead due to the backup data adjustment and improve the system efficiency and performance.

PREFERRED EMBODIMENTS OF THE INVENTION

Figure 1:
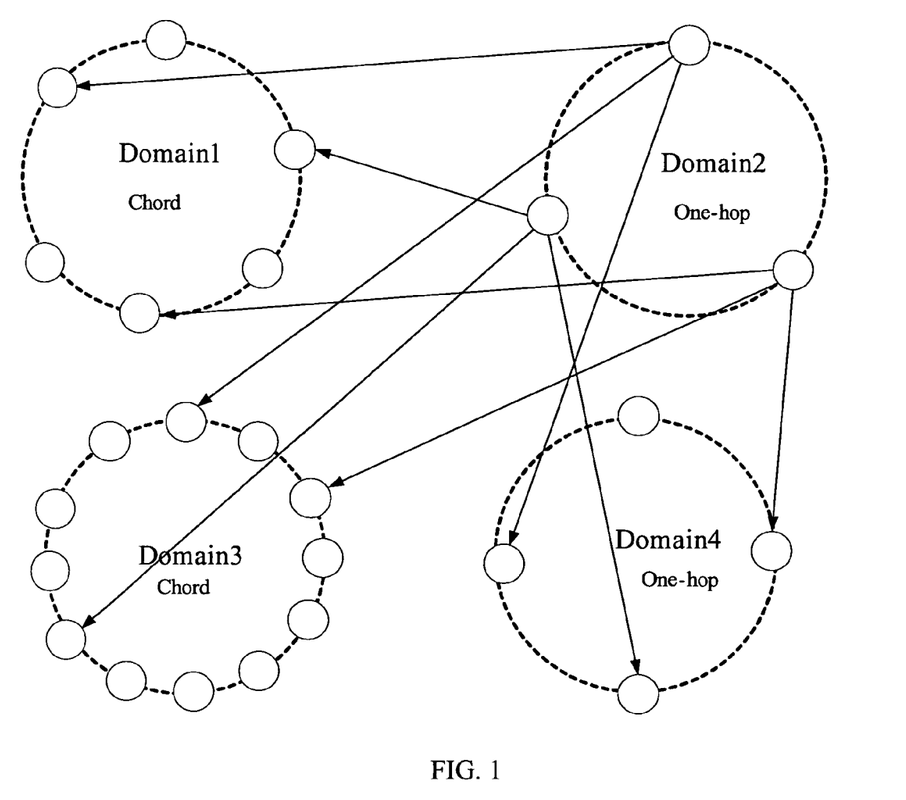
FIG. 1 is an illustration of the P2P network architecture in the present invention.

The method for resource backup in the present invention is implemented based on domain optimized P2P network architecture, and the network architecture will be introduced briefly in the following:

The whole P2P network in this network architecture is divided into several domains according to the geographical positions and the domain identifier (domain ID) of each domain is determined, the nodes having the same domain identifier make up a domain, and the nodes in the domain make up a sub P2P network according to a certain DHT algorithm, and each node in the domain maintains contact with other domains according to certain rules (refer to FIG. 1).

Figure 2:
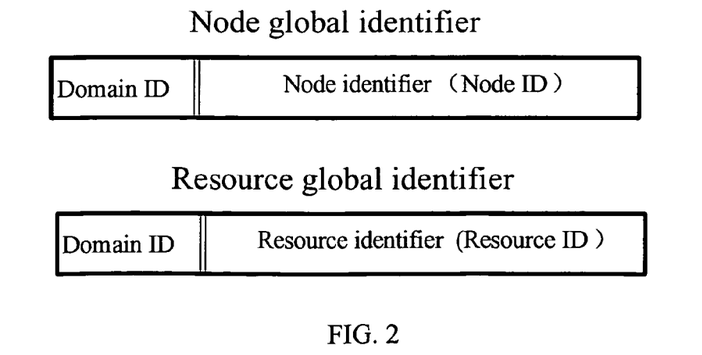
FIG. 2 is an illustration of the global identifiers of the node and resource information in the present invention.

Each node (or resource) in the network has a unique node (or resource) global identifier in the overall network, as shown in FIG. 2, the global identifier consists of a domain identifier and a node (or resource) identifier, the node or resource determines its domain identifier according to the domain at which the node or resource itself is located, and the node (or resource) identifier is acquired according the node (or resource) information such as the node (resource) ID, port number (or resource name) with hash algorithm. The inserting and inquiring of a node (resource) in the network are performed according to the node (or resource) global identifier. In this network, each resource is stored in the node in the same domain (that is, the resource and the node have the same domain identifier), moreover, the node global identifier is the same as or similar to the resource global identifier (generally taking its backward closest).

The node identifier is acquired with the hash algorithm according to the node characteristic information, and the node characteristic information is the node's unique information, such as IP address, network card number or machine serial number, and the hash algorithm selection can be random;

The resource identifier is acquired with hash algorithm according to the characteristic information of the resource information, and said resource characteristic information is the information identifying the resource, and the information comprises the specific content of the resource, user name, user data name, and the hash algorithm selection might be random.

Figure 3:
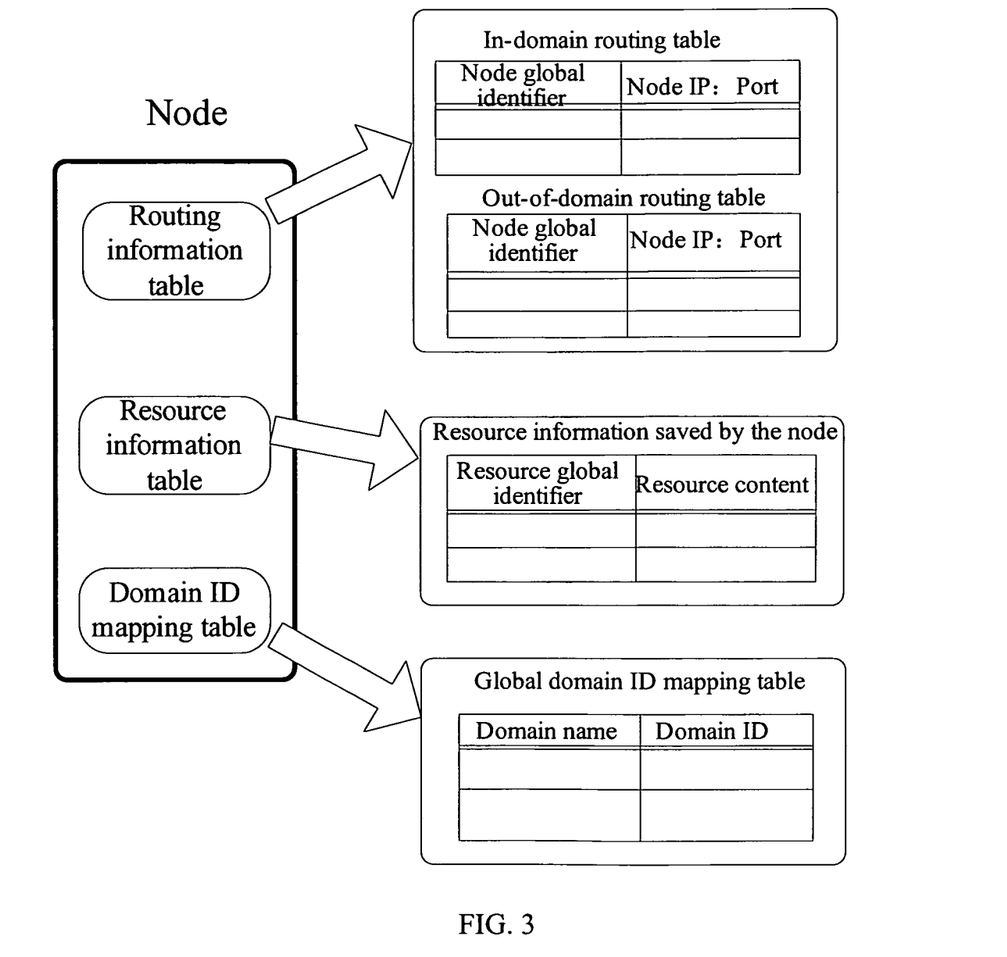
FIG. 3 is an illustration of content stored in the node in the present invention.

The content required to be stored in each node is as shown in FIG. 3, and the content comprises a routing information table, a resource information table and a domain ID mapping table. Wherein, the routing information table comprises the in-domain routing table in the local domain at which the node is located and the out-of-domain routing table including the routing information of the out-of-domain node that remains contact with the local node; the resource information table comprises the resource information and the backup resource information stored in the node. Herein, the backup resource information comprises the backups of the out-of-domain resource information and the in-domain resource information.

The resource information stored in the resource information table comprises the resource global identifier and the content of the resource information.

In practical networks, the abnormal shutdown of a large number of network nodes often happens in the adjoining domain, and in order to better ensure the availability of the data, the present invention backs up not only in-domain data but also out-of-domain data (the data have different domain ID from that of the resource), thus to guarantee the advantage of the in-domain backup and also meet the out-of-domain disaster tolerance requirement, and further guarantee the data recoverability.

Some definitions in the present invention will be illustrated in the following:

Host node: the node at which the resource information is stored in the local domain according to a storage rule; specifically, the storage rule is: the resource is stored in a certain node, and the node ID of this node and the resource ID of this resource information are closest and the node ID is no less than the resource ID, and if there is no node ID larger than the resource ID, the resource is stored in the node which has the minimum ID in the domain.

The local domain: the domain at which the host node is located;

Backup node in the local domain: the node in the local domain which backs up the resource information of the host node according to a certain backup rule of the local domain; specifically, the backup rule of the local domain might be: the backward node of the host node works as the backup node of the local domain.

According to the size of the node ID, the nodes are arranged into a big circular ring, called DHT ring (as shown in the figures), according to a certain order (generally the ascending order), a certain node takes the first node encountered in clockwise direction as its backward node, the first node encountered in the anti-clockwise direction as its forward node, and each node has one forward node and backward node.

Backup domain: the domain used to back up the data of the local domain, the backup domain selection rule is to select the domain which has similar scale as the local domain or has relatively light load as the backup domain; the selection of the backup domain can use the manually designated table of mapping the local domain to the backup domain, certain algorithms can be used to select the backup domain of the local domain according to the scale of the domain.

Out-of-domain backup node: out-of-domain node for backing up the resource information according to certain out-of-domain backup rules. When selecting an out-of-domain backup node, the resource can be backed up to the corresponding backup node in the backup domain according to the resource ID of the resource information of the local domain, for example, the out-of-domain backup node can be the node whose node ID in the backup domain is the same or similar to the resource ID and it is the first node whose node ID is no less than the resource ID; when there is data joined, deleted or updated, the backup data in the backup domain should be correspondingly updated.

The present invention backs up the resource information according to the resource ID, and when there is change in the node in the local domain, there is no need to adjust the corresponding backup data stored in the out-of-domain node. Only when the resource information is changed (there is resource information joined in, deleted or updated) that the corresponding adjustment should be made out of the domain.

Figure 4:
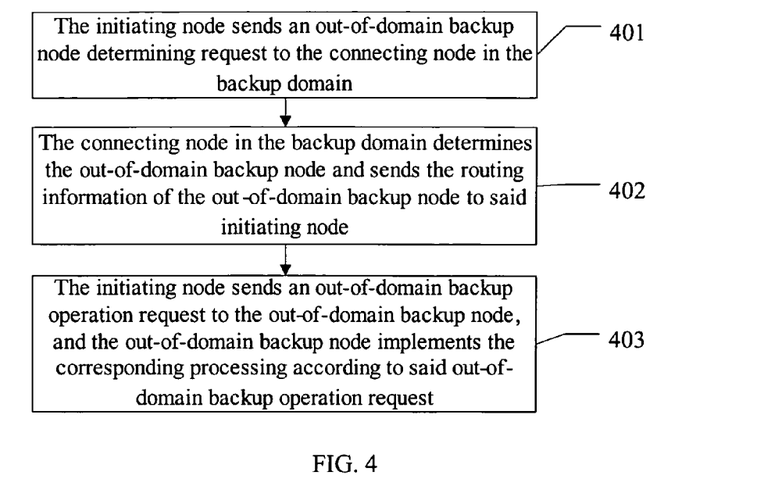
FIG. 4 is a flow chart of the method for resource information backup operation in the present invention.

As shown in FIG. 4, the method for resource information backup operation based on the P2P network in accordance with the present invention comprises:

Step 401: the initiating node sends an out-of-domain backup node determining request to the connecting node in the backup domain;

Said out-of-domain backup node determining request comprises the resource global identifier information of the resource information that should be backed up, and the connecting node in said backup domain and said host node have different domain identifiers;

Herein, the resource global identifier information can be the determined resource global identifier or the resource global identifier range.

Step 402: the connecting node in said backup domain determines the out-of-domain backup node according to said resource global identifier information and the out-of-domain backup rule, and sends the routing information of said out-of-domain backup node to said initiating node;

Step 403: said initiating node sends an out-of-domain backup operation request to said out-of-domain backup node according to said routing information, and said out-of-domain backup node performs the corresponding processing according to said out-of-domain backup operation request.

If said out-of-domain backup operation request is an out-of-domain backup request, said initiating node is the host node at which the resource information is located, and the out-of-domain backup request sent by the hos node to said out-of-domain backup node carries the resource information content of said resource information, and said out-of-domain backup node backs up the resource information content and the resource global identifier information;

If said out-of-domain backup operation request is an out-of-domain backup inquiry request, said initiating node is an inquiry node, and said out-of-domain backup node returns the resource information content of the resource information to be inquired to the inquiry node according to the resource global identifier information in the out-of-domain backup inquiry request;

If said out-of-domain backup operation request is an out-of-domain backup recovery request, said initiating node is the node detecting the failure of the host node at which the resource information is located, and said resource global identifier information is the resource global identifier or the resource global identifier range of the resource information to be recovered, and said resource global identifier or the resource global identifier range is determined by the initiating node according to the in-domain resource storage rule, and said out-of-domain backup node returns the resource information content of the resource information corresponding to the resource global identifier or a resource global identifier in the resource global identifier range to said initiating node according to the out-of-domain backup recovery request, and the content is saved by the initiating node.

In the above first method, the out-of-domain backup operation request is sent by the initiating node to the out-of-domain backup node according to the routing information returned by the connecting node in the backup domain, or forwarded by the connecting node in the backup domain to the out-of-domain backup node, the request carries the routing information of the initiating node so that the out-of-domain backup node processes the request and sends the processing result to the initiating node, and the second method specifically comprises:

Step A: the initiating node sends an out-of-domain backup operation request to the connecting node in the backup domain, and said out-of-domain backup node operation request comprises the resource global identifier information of the resource information which should be backed up, and the connecting node in the backup domain and said host node have different domain identifiers;

Step B: the connecting node in said backup domain determines the out-of-domain backup node according to said resource global identifier information and the out-of-domain backup rule, and forwards said out-of-domain backup operation request to said out-of-domain backup node, and the request carries the resource global identifier information of the resource information to be operated and the routing information of the initiating node;

Step C: said out-of-domain backup node performs the corresponding processing according to said out-of-domain backup operation request and returns the processing result to said initiating node according to said routing information.

The abovementioned out-of-domain backup operation request is an out-of-domain backup request, a backup inquiry request or an out-of-domain backup recovery request; if the out-of-domain backup operation request is an out-of-domain backup request, the request also carries the content of the resource information to be backed up.

When the data cannot be acquired due to a certain abnormality of both the host node in the local domain (node to store the original data of the resource) and the backup node in the local domain (node to back up the data), inquire and recover the data via the backup domain.

Specifically, the data is inquired according to the global identifier of the resource information, when the desired data is not found in the local domain, inquire the data in the backup domain, and the inquiry request is a backup data inquiring request which is different from the request for directly inquiring the data;

When both the host node and the backup node in the local domain shut down abnormally, and a certain node in the local domain detects this failure (determined by the DHT algorithm applied in the domain and the backup method), it actively sends a data recovery request to the backup domain, and the request carries the global resource identifier range of the resource information to be recovered.

Apply a certain in-domain backup method to back up the data of the local domain in the local domain, and the in-domain backup method can be the backup method for a single DHT network, and the backup method selection can be random.

The present invention will be further illustrated in combination with specific embodiments:

Each node in FIGS. 5, 6, 7 and 8 is a home subscriber server (HSS), and the HSS is the main user database for supporting the IMS network entity that processes call/session. The HSS comprises a user configuration file that authenticates and authorizes a user's identity and provides the information related to the user's physical position. In this embodiment, each HSS (called node in the following) saves the some users' data that is called the resource information.

For simplification, there are two domains: domain A and domain B shown in the figures, wherein, nodes N7~N46 belong to domain A, and nodes n3~n53 belong to domain B, the serial numbers of the nodes are the node IDs. Wherein, domain B is the backup domain of domain A. The backup domain is selected according to the scale or the loading situation of the domain in practical networks, and after the backup domain is selected, when there is new node added, the domain ID of the node in the backup domain is designated, and all nodes in domain A save the information. Domain A also works as the backup domain of other domains at the same time. For simplification, other domains are not shown in the figures.

Each node in the figures applies One-hop DHT algorithm in the domain (that is, each in-domain node stores one copy of in-domain global routing table so that it connects with other in-domain nodes), moreover, each node stores one copy of the out-of-domain routing table which comprises the routing information of some out-of-domain nodes.

The first application embodiment: data backup

The present invention mainly aims at out-of-domain backup in the present invention, herein, the in-domain backup applies the simplest form, that is, the backward node of the host node is selected as the backup node, and the backup node is used to back up all resource information in the host node (immediately update the backup data when there is new data added in or there is data updated).

The out-of-domain backup rule in this embodiment is: the out-of-domain node for backing up the resource information is a node with the node ID which is no less than the resource ID of the resource information and is closest to the resource ID of the resource information.

Figure 5:
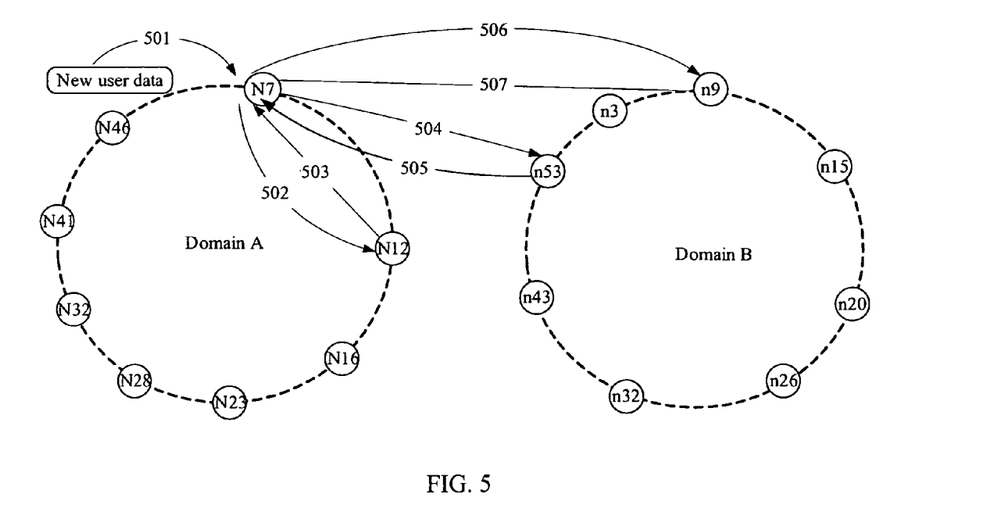
FIG. 5 illustrates the process of backing up the resource information in the first embodiment in accordance with the method of the present invention.

As shown in FIG. 5, the steps of backing up the data are:

Step 501: When there is new data added in or there is data updated, the host node (node N7) stores the new data (resource ID=5);

Step 502: Node N7 sends a backup request to its backward node (node N12) to back up the new data;

Step 503: Node N12 backs up the new data and returns a response;

Step 504: Node N7 takes an out-of-domain backup of the newly added resource information, it sends an out-of-domain backup request to the connecting node (such as the node n53) in the corresponding backup domain, and the request comprises the resource global identifier of the resource information that should be backed up;

Wherein, the connecting node in the backup domain is selected randomly.

Step 505: Node n53 takes the resource ID (resource ID=5) out from the resource global identifier included in the request, acquires the node (the node whose node ID is closest but no less than the resource ID, called the out-of-domain backup node) to which the resource information should be backed up by inquiring its own in-domain routing table, herein it is node n9, and node n53 sends the routing information of node n9 to node N7 which initiates the backup request;

Step 506: Node N7 sends an out-of-domain backup request to node n9, and the request comprises the resource global identifier and the resource information content of the resource information;

Step 507: Node n9 backs up the resource information according to the received request, and returns a backup successful response.

Figure 6:
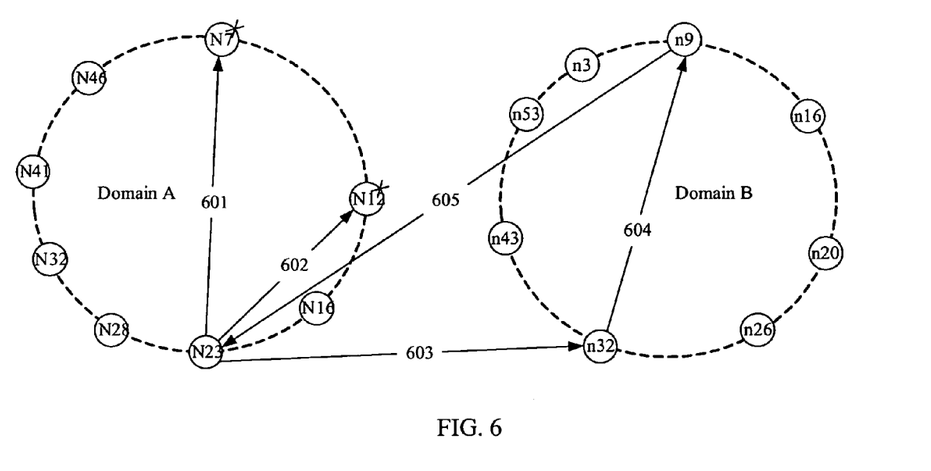
FIG. 6 illustrates the processing of inquiry the backup resource information in the second embodiment in accordance with the method of the present invention.

The second application embodiment: out-of-domain backup data inquiring:

Data inquiring divides into in-domain data inquiring and out-of-domain backup data inquiring, herein, only the process of out-of-domain backup data inquiring is provided, and the process of in-domain data inquiring can be inquiring the data in the local domain according to data storage rules by directly inquiring the global identifier of the resource information (the out-of-domain backup data inquiring is only performed when the data or the backup data of the local domain are not usable), as shown in FIG. 6, the inquiring process comprises:

Step 601: Inquiring node N23 inquires its in-domain routing table according to the resource global ID of the data to be inquired, acquires the routing information of the host node (herein it is the node N7) at which the data is located according to the resource ID (such as resource ID=6) in the resource global identifier, and sends an inquiring request to node N7, and the request carries the resource global identifier of the data to be inquired;

Step 602: If the request fails due to the abnormal shutdown of node N7 or other conditions, node N23 sends a backup data inquiring request to the in-domain backup node (node N12);

Step 603: When there is some abnormality in node N12 so that the inquiry request fails, node N23 sends an out-of-domain backup inquiry request to a certain known node (such as node n23) in the backup domain, the request comprises the resource global identifier of the data to be inquired; (herein, the backup data inquiring request is different from the direct data inquiring request, the request here comprises the global identifier of the resource since the backup domain might also has the backup data of other domains);

Step 604: Node n32 determines the out-of-domain backup node of the resource according to the resource global identifier and the out-of-domain backup rule, acquires the routing information of the out-of-domain backup node (herein, it is node n9) by inquiring its own in-domain routing table, forwards an out-of-domain backup inquiry request to node n9, and the forwarded inquiry request carries the routing information of N23;

Step 605: node n9 returns the resource information to be inquired to node N23.

The out-of-domain backup data inquiring is only performed when the data host node and the backup node of the local domain cannot find the data, which is generally caused by the abnormal shutdown of a lot of in-domain nodes, therefore, the data can be acquired normally by inquiring the out-of-domain backup data.

Figure 7:
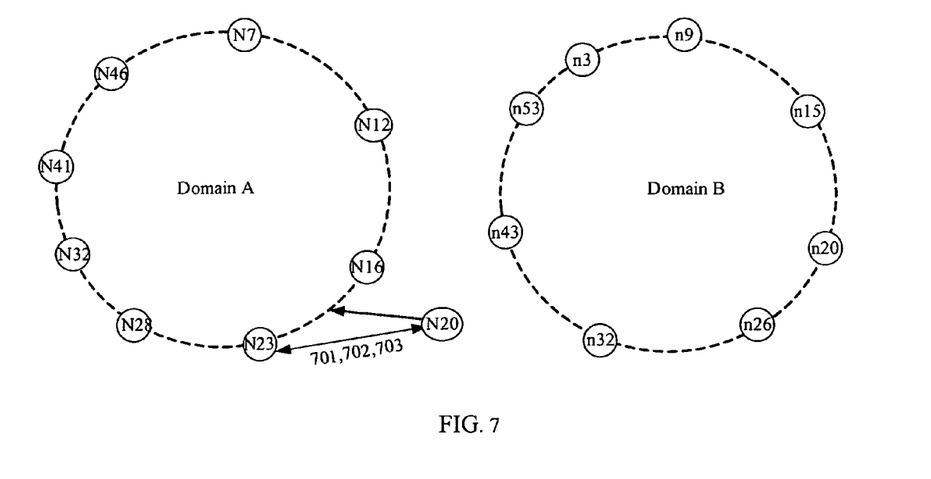
FIG. 7 illustrates the process of adding new nodes in the third embodiment in accordance with the method of the present invention.

The third application embodiment: data transferring when there is a node in/out:

When there is new node (such as node N20) joined in, there are three parts of data to be backed up from the backward node, as shown in FIG. 7, the specific backup steps comprise:

Step 701: the resource information (the resource information whose resource ID is between the forward node ID and the new node ID) saved by the new node working as the host node, which is herein the data whose resource ID is (16, 20] (indicating the range of the data saved by the node working as the host node, and the node ID of these data should be larger than 16 but no larger than 20);

Step 702: The backup data (the backup data saved in the backward node and whose resource ID is no larger than the new node ID of the local domain) saved by the new node working as the out-of-domain backup node, which is the data whose resource ID is (16, 20] in domain C, supposing domain A (not shown in the figures) is the backup domain of domain C here;

Step 703: the backup data (the backup data of the local domain saved in the backward node) of the forward node saved by the new node working as the in-domain backup node, herein, it is the data whose resource ID is in (12, 16].

The above several steps only need to back up the data from the backward node (N23) of the newly added node, and after the data is backed up, the new node needs to perform in-domain backup instead of out-of-domain backup on the data, and then the node notifies other nodes to update the routing table according to the routing update method in the local domain. Similarly, the normal exit of an in-domain node is an inverse process of the node joining in, when a node exits, the node transfers all saved resource information to its backward node, and the backward node only needs to make in-domain backup of the data rather than out-of-domain backup of the data.

Figure 8:
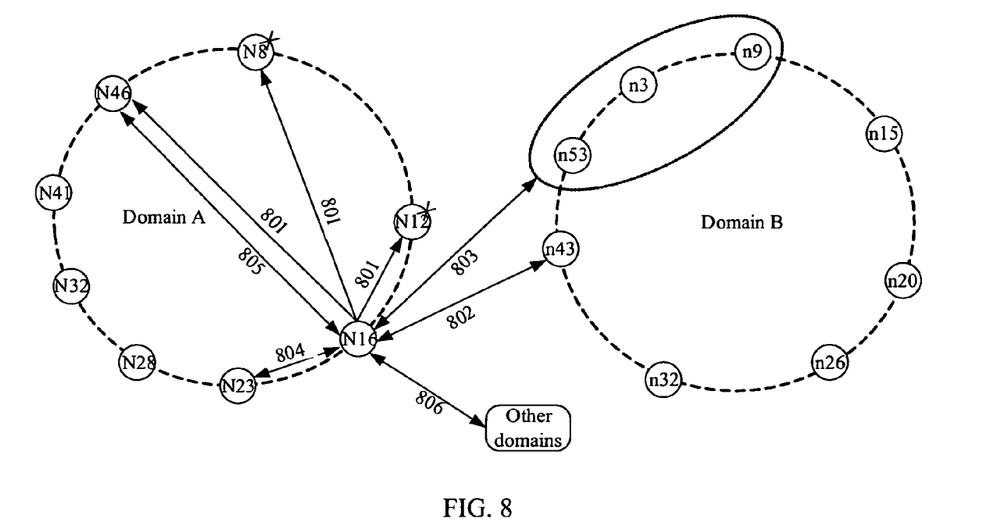
FIG. 8 is an illustration of recovering the resource information with the out-of-domain backup data in the fourth embodiment in accordance with the method of the present invention.

The fourth application embodiment: data recovery process:

Herein, only the situation that both the in-domain host node and the in-domain backup node fail at the same time is considered, for the situation that only one of them fails, the data can be recovered with in-domain data recovery mechanism, and there is no need to change the out-of-domain backup data. The backward node N16 of the in-domain backup node detects that more than two continuous nodes fail to work (node N16 detects the failure of several continuous forward nodes according to the alive mechanism between the node N16 and its forward node), it backs up the resource information from the out-of-domain backup node of the lost data according to the out-of-domain backup rule, and then re-backs up the data.

As shown in FIG. 8, the specific steps are as follows:

Step 801: the backward node N16 of the in-domain backup node detects a failure (suppose only N7 and N12 fail), it only knows that the ID range of the lost in-domain resource information is [the forward node ID of the failed host node, the failed host node ID], the failed host node is node N7 here, the lost resource information is the resource information whose resource ID is located in (46, 7], that is, the resource information whose resource ID is larger than 46 but no larger than 7;

The out-of-domain backup rule in this embodiment is: the out-of-domain node backing up the resource information is a node with this kind of node ID: its node ID is no less than the resource ID of said resource information, and is closest to the resource ID of the resource information.

The data recovery and backup by node N16 comprise:
i. Recover the lost in-domain data via the out-of-domain backup;
ii. Perform in-domain backup on the recovered data in the backward node of node N16;
iii. Perform in-domain backup on the data that is backed up in node N16 previously by the forward node N12 of node N16;
iv. Back up the data stored in the forward node of the failed host node;
v. Re-back up the out-of-domain backup data that is charged by the failed node;

Step 802: Node N16 uses the node ID=46 of the forward node of the failed host node inquires in the backup domain (acquire the routing information of node n43 according to the routing information of the node in the domain B saved in the out-of-domain routing table), to searches out that the backward node corresponding to this node ID is node n53; then uses the node ID=7 of node N7 to inquire in the backup domain to search out its backward node n9; node N16 sends node n53 a request for inquiring the routing information of the node whose node ID is in (53, 7]. The lost resource information in the original domain is:
i. the data whose resource ID is in (46, 53] backed up in the node N53;
ii. the data whose resource ID is in (3, 7] backed up in the node n9;
iii. all data that are backed up by the nodes between node n53 and node n9, that is, all data backed up in node n3. The data larger than 53 and smaller than 3;

Step 803: Node N16 backs up the desired data from out of the domain, and node N16 is the host node of the resource information;

Step 804: Node N16 performs once again repeatedly in-domain back-up on the justly recovered data and the in-domain backup data stored in N 16 by the failed forward node of node N16, that is, backs up the recovered data and the in-domain backup data into its backward node N23;

Step 805: Node N16 backs up the data stored by node N46;

Step 806: the range of the lost out-of-domain backup data is: (the forward node ID of the failed host node, the forward node ID of node N16], that is, the out-of-domain backup data whose resource ID is in the range of (46, 12]. If the backup data relate to several domains, the node C needs to re-back up the needed data in several domains respectively. The specific process is the same as recovering the data in the failed node, and the process will be omitted here.

If it needs to further guarantee the reliability of the data, the data might be backed up for several copies out of the domain, for example, besides of backing up the data in the out-of-domain backup node for one time, back up the resource into the backward node of the out-of-domain backup node.

The above process does not need to re-back up the data out of the domain, and the out-of-domain backup data is unnecessary to be changed.

Figure 9:
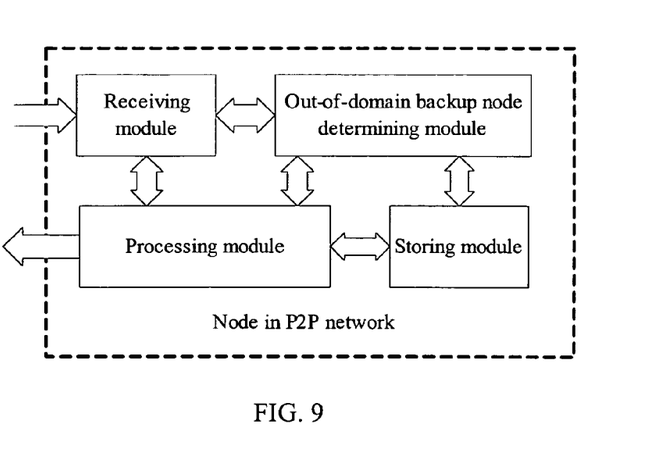
FIG. 9 illustrates the module structure of the nodes in the P2P network in the present invention.

In order to implement the above first method, the present invention also provides a network architecture and classifies the nodes according to the function modules, as shown in FIG. 9, a node in said P2P network comprises a receiving module, an out-of-domain backup node determining module connecting with said receiving module, and a processing module connecting with said out-of-domain backup node determining node and the receiving module, and a storing module connecting with said out-of-domain backup node determining node and the processing module, wherein:

The receiving module is configured to receive the out-of-domain backup node determining request sent by the initiating node, and said out-of-domain backup node determining request includes the resource global identifier information of the resource information which should be backed up, the connecting node in the backup domain and the host node have different domain identifiers; it is also used to receive the out-of-domain backup operation request sent by said initiating node;

The out-of-domain backup node determining module is configured to determine the out-of-domain backup node according to the resource global identifier information and the out-of-domain backup rule;

The processing module is configured to send the routing information of said out-of-domain backup node to said initiating node according to the determined out-of-domain backup node; it is also used to perform the corresponding processing according to said out-of-domain backup operation request.

If said out-of-domain backup operation request is an out-of-domain backup request, said initiating node is the host node at which the resource information is located, said out-of-domain backup operation request also carries the content of said resource information, and said processing module is configured to back up the resource information content and the resource global identifier information according to the out-of-domain backup operation request;

If said out-of-domain backup operation request is an out-of-domain backup inquiry request, said initiating node is an inquiry node, and said processing module is configured to return the content of the resource information to be inquired to the inquiry node according to the resource global identifier information;

If said out-of-domain backup operation request is an out-of-domain backup recovery request, said initiating node is the node detecting the failure of the host node at which said resource information is located, and the resource global identifier information in said out-of-domain backup recovery request is the resource global identifier or the resource global identifier range of the resource information to be recovered, the resource global identifier or the resource global identifier range of the resource information is determined by the initiating node according to the in-domain resource storage rule, and said processing module is configured to return the resource information content corresponding to the resource global identifier or a resource global identifier in the resource global identifier range to said initiating node according to the out-of-domain backup recovery request.

The storing module is configured to store the resource information table, the in-domain routing table and the out-of-domain routing table, wherein, said resource information table comprises the resource global identifier and the resource information content of the resource information, and said in-domain routing table comprises the node global identifier and the routing information of the in-domain node which has connection relationship with said node, and said out-of-domain routing table comprises the node global identifier and the routing information of the out-of-domain node which has connection relationship with said node, and said out-of-domain backup node is determined with reference to the node global identifier in the in-domain routing table.

The method of the present invention and the P2P network thereof, and the in-domain data backup can guarantee that the data can still be recovered even when there are few nodes exiting the network normally or abnormally, the present invention can maintain the advantage of in-domain backup and also implement remote disaster tolerance, thus better guarantee the reliability and availability of the data. Moreover, the present invention makes out-of-domain backups of the resource information, thus when there is node in or out the local domain network, there is no need to adjust the out-of-domain backup data, only when there is change in the resource the out-of-domain backup data should be adjusted, therefore, it can effectively reduce the extra overhead due to the backup data adjustment and improve the system efficiency and performance.

INDUSTRIAL APPLICABILITY

Compared with the prior art, the method of the present invention and the P2P network thereof better guarantee the reliability and availability of the data, and effectively reduces the extra overhead due to the backup data adjustment, and improves the system efficiency and performance.

What is claimed is:

1. A method for resource information backup operation based on peer to peer network, wherein a node in the peer to peer network has a node global identifier including a domain identifier and a node identifier, and said resource information in the peer to peer network has a resource global identifier including a domain identifier and a resource identifier, and said resource information is saved in a host node having the same domain identifier as said resource information, and said method comprises:

an initiating node sending an out-of-domain backup node determining request to a connecting node in backup domain, and said out-of-domain backup node determining request including the resource global identifier of said resource information, and the connecting node in said backup domain and said host node in which the resource information is saved have different domain identifiers;

the connecting node in said backup domain determining an out-of-domain backup node according to information of said resource global identifier and out-of-domain backup rules, and sending routing information of said out-of-domain backup node to said initiating node; and said initiating node sending an out-of-domain backup operation request to said out-of-domain backup node according to said routing information, said out-of-domain backup operation request including the information of the resource global identifier of said resource information, and said out-of-domain backup node implementing a corresponding processing according to said out-of-domain backup operation request.

2. The method of claim 1, wherein:
if said out-of-domain backup operation request is an out-of-domain backup request, said initiating node is the host node in which the resource information is saved, and the out-of-domain backup request sent by said host node to said out-of-domain backup node also includes a content of said resource information, and the step of said out-of-domain backup node performing processing according to the out-of-domain backup operation request comprises: the out-of-domain backup node backing up resource information content and the resource global identifier of said resource information according to said out-of-domain backup request;
if said out-of-domain backup operation request is an out-of-domain backup inquiry request, said initiating node is an inquiry node, and the step of the out-of-domain backup node performing processing according to the out-of-domain backup operation request comprises: said out-of-domain backup node returning the the resource information content to be inquired to said inquiry node according to the information of the resource global identifier in the out-of-domain backup inquiry request;
if said out-of-domain backup operation request is an out-of-domain backup recovery request, said initiating node is a node detecting failure of the host node in which the resource information is saved, and said information of the resource global identifier is the resource global identifier or the resource global identifier range of the resource information to be recovered, and said resource global identifier or the resource global identifier range of the resource information to be recovered is determined by said initiating node according to in-domain resource storage rules, and the step of the out-of-domain backup node performing processing according to the out-of-domain backup operation request comprises: said out-of-domain backup node returning the resource information content corresponding to said resource global identifier or a resource global identifier in the resource global identifier range to said initiating node, and then the initiating node saving the resource information content.

3. The method of claim 1, wherein, the node in said peer to peer network saves a resource information table, an in-domain routing table and an out-of-domain routing table, wherein, said resource information table comprises the resource global identifier and resource information content of the resource information, and said in-domain routing table comprises node global identifier and the routing information of an in-domain node which has connection relationship with the nodes in the in-domain routing table, and said out-of-domain routing table comprises the node global identifier and the routing information of out-of-domain nodes which has connection relationship with the nodes saving the out-of-domain routing table, and in the step of determining the out-of-domain backup node, the connecting node in the backup domain determines the out-of-domain backup node according to the resource global identifier information of the resource information and out-of-domain backup rules in combination with the node global identifier in the in-domain routing table.

4. A node used in peer to peer network, said node having a node global identifier including a domain identifier and a node identifier, and resource information of the peer to peer network having a resource global identifier including a domain identifier and a resource identifier, and said node working as an initiating node, a host node, a connecting node and an out-of-domain backup node in the peer to peer network;
said node comprising a receiving module, an out-of-domain backup node determining module connecting with said receiving module, and a processing module connecting with said receiving module and said out-of-domain backup node determining module, wherein:
the receiving module is configured to receive an out-of-domain backup node determining request sent by said initiating node, wherein, said out-of-domain backup node determining request includes resource global identifier information of the resource information which should be backed up, and the node at which said receiving module is located and the host node in which said resource information to be backed up is saved have different domain identifiers; said receiving module is also configured to receive an out-of-domain backup operation request sent by said initiating node, the out-of-domain backup operation request including the resource global identifier information of the resource information;
said out-of-domain backup node determining module is configured to determine the out-of-domain backup node according to the resource global identifier information and the out-of-domain backup rules in the out-of-domain backup node determining request;
said processing module is configured to send routing information of the out-of-domain backup node determined by the out-of-domain backup node determining module to the initiating node; said processing module is also configured to implement a corresponding processing according to said out-of-domain backup operation request sent by said initiating node.

5. The node of claim 4, wherein, said processing module is configured to:
if said out-of-domain backup operation request is an out-of-domain backup request, and when said initiating node is the host node in which the resource information is saved and said out-of-domain backup operation request includes resource information content of said resource information, back up the resource information content and the resource global identifier of the resource information included in said out-of-domain backup operation request;
if said out-of-domain backup operation request is an out-of-domain backup inquiry request, when said initiating mode is an inquiry node, return the resource information content of the resource information to the inquiry node according to the resource global identifier information in said out-of-domain backup inquiry request;
if said out-of-domain backup operation request is an out-of-domain backup recovery request, when said initiating node is the node that detects failure of the host node in which said resource information is saved, and the resource global identifier information in said out-of-domain backup recovery request is the resource global identifier or the resource global identifier range of the resource information that needs to be recovered, and the resource global identifier or the resource global identifier range of the resource information to be recovered is determined by the initiating node according to in-domain resource storage rules, return the resource information content corresponding to the resource global identifier or a resource global identifier in the resource global identifier range to the initiating node according to said out-of-domain backup recovery request.

6. The node of claim 4, wherein, said node also comprises a storing module connecting with said out-of-domain backup node determining node and the processing module, the storing module is configured to store resource information table, in-domain routing table and out-of-domain routing table, wherein, said resource information table comprises the resource global identifier and resource information content of the resource information, said in-domain routing table comprises a node global identifier and routing information of an in-domain node having connection relationship with a node saving the in-domain routing table, and said out-of-domain routing table comprises the node global identifier and routing information of an out-of-domain node having connection relationship with a node saving the out-of-domain routing table, and said out-of-domain backup node determining module is configured to determine the out-of-domain backup node according to the resource global identifier information in the out-of-domain backup node determining request, out-of-domain backup domain rules and the node global identifier in the in-domain routing table.

7. A method for resource information backup operation based on peer to peer network, wherein a node in the peer to peer network has a node global identifier including a domain identifier and a node identifier, and said resource information of the peer to peer network has a resource global identifier including a domain identifier and a resource identifier, and said resource information is saved in a host node which has the same domain identifier as said resource information, and said method comprises:
an initiating node sending an out-of-domain backup operation request to an connecting node in a backup domain, said out-of-domain backup node operation request including the resource global identifier of the resource information, and a connecting node in the backup domain and said host node saving the resource information have different domain identifiers;
the connecting node in said backup domain determining an out-of-domain backup node according to said resource global identifier and out-of-domain backup rules, and forwarding said out-of-domain backup operation request to said out-of-domain backup node, and the out-of-domain backup operation request including the routing information of the initiating node and resource global identifier information of the resource information;
said out-of-domain backup node implementing a corresponding processing according to said out-of-domain backup operation request.

8. The method of claim 7, wherein, said out-of-domain backup operation request is an out-of-domain backup request, an out-of-domain backup inquiry request or an outer-of-domain recovery request; if said out-of-domain backup operation request is the out-of-domain backup request, said out-of-domain backup request also includes resource information content to be backed up.

9. A node used in peer to peer network, and said node having a node global identifier including a domain identifier and a node identifier, and resource information of the peer to peer network having a resource global identifier including a domain identifier and a resource identifier, and said node being configured to:
save the global identifiers of the other nodes in the same domain, save the resource information having the same domain identifier therewith, back up the resource information saved in out-of-domain nodes having different domain identifiers, and determine an out-of-domain backup node to back up the resource information saved in said node according to the resource global identifier of the resource information, the global identifiers of nodes in a backup domain, as well as out-of-domain backup rules.

10. The node of claim 9, wherein, said node is also configured to back up the resource information saved in other nodes having the same domain identifier as said node.

11. A peer to peer network comprising:
a plurality of nodes including a node;
said node having a node global identifier including a domain identifier and a node identifier, and resource information of the peer to peer network having a resource global identifier including a domain identifier and a resource identifier, and said node working as an initiating node, a host node, a connecting node and an out-of-domain backup node in the peer to peer network;
said node comprising a receiving module, an out-of-domain backup node determining module connecting with said receiving module, and a processing module connecting with said receiving module and said out-of-domain backup node determining module, wherein:
the receiving module is configured to receive an out-of-domain backup node determining request sent by said initiating node, wherein, said out-of-domain backup node determining request includes resource global identifier information of the resource information which should be backed up, and the node at which said receiving module is located and the host node in which said resource information to be backed up is saved have different domain identifiers; said receiving module is also configured to receive an out-of-domain backup operation request sent by said initiating node, the out-of-domain backup operation request including the resource global identifier information of the resource information;
said out-of-domain backup node determining module is configured to determine the out-of-domain backup node according to the resource global identifier information and the out-of-domain backup rules in the out-of-domain backup node determining request;
said processing module is configured to send routing information of the out-of-domain backup node determined by the out-of-domain backup node determining module to the initiating node; said processing module is also configured to implement a corresponding processing according to said out-of-doimain backup operation request sent by said initiating node.

12. The peer to peer network of claim 11, wherein said processing module is configured to:
if said out-of-domain backup operation request is an out-of-domain backup request, and when said initiating node is the host node in which the resource information is saved and said out-of-domain backup operation request includes resource information content of said resource information, back up the resource information content and the resource global identifier of the resource information included in said out-of-domain backup operation request;
if said out-of-domain backup operation request is an out-of-domain backup inquiry request, when said initiating mode is an inquiry node, return the resource information content of the resource information to the inquiry node according to the resource global identifier information in said out-of-domain backup inquiry request;
if said out-of-domain backup operation request is an out-of-domain backup recovery request, when said initiating node is the node that detects failure of the host node in which said resource information is saved, and the resource global identifier information in said out-of-domain backup recovery request is the resource global identifier or the resource global identifier range of the resource information that needs to be recovered, and the resource global identifier or the resource global identifier range of the resource information to be recovered is determined by the initiating node according to in-domain resource storage rules, return the resource information content corresponding to the resource global identifier or a resource global identifier in the resource global identifier range to the initiating node according to said out-of-domain backup recovery request.

13. The peer to peer network of claim 11, wherein said node also comprises a storing module connecting with said out-of-domain backup node determining node and the processing module, he storing module is configured to store resource information table, in-domain routing table and out-of-domain routing table, wherein, said resource information table comprises the resource global identifier and resource information content of the resource information, said in-domain routing table comprises a node global identifier and routing information of an in-domain node having connection relationship with a node saving the in-domain routing table, and said out-of-domain routing table comprises the node global identifier and routing information of an out-of-domain node having connection relationship with a node saving the out-of-domain routing table, and said out-of-domain backup node determining module is configured to determine the out-of-domain backup node according to the resource global identifier information in the out-of-domain backup node determining request, out-of-domain backup domain rules and the node global identifier in the in-domain routing table.

14. A peer to peer network comprising:
a plurality of nodes including a node;
said node having a node global identifier including a domain identifier and a node identifier, and resource information of the peer to peer network having a resource global identifier including a domain identifier and a resource identifier, and said node being configured to:
save the global identifiers of the other nodes in the same domain, save the resource information having the same domain identifier therewith, back up the resource information saved in out-of-domain nodes having different domain identifiers, and determine an out-of-domain backup node to back up the resource information saved in said node according to the resource global identifier of the resource information, the global identifiers of nodes in a backup domain, as well as out-of-domain backup rules.

15. The peer to peer network of claim 14, wherein said node is also configured to back up the resource information saved in other nodes having the same domain identifier as said node.

* * * * *

UNITED STATES PATENT AND TRADEMARK OFFICE
CERTIFICATE OF CORRECTION

PATENT NO. : 8,856,581 B2  Page 1 of 1
APPLICATION NO. : 13/138734
DATED : October 7, 2014
INVENTOR(S) : Peng et al.

It is certified that error appears in the above-identified patent and that said Letters Patent is hereby corrected as shown below:

In the claims,

Column 19, line 16, "he storing" should be changed to --the storing--.

Signed and Sealed this
Twenty-fourth Day of February, 2015

Michelle K. Lee
*Deputy Director of the United States Patent and Trademark Office*